(12) United States Patent
de Boer et al.

(10) Patent No.: US 6,658,013 B1
(45) Date of Patent: Dec. 2, 2003

(54) METHOD AND APPARATUS FOR ENSURING SURVIVABILITY OF INTER-RING TRAFFIC

(75) Inventors: Evert de Boer, Nepean (CA); David Steele, Kanata (CA); Peter Phelps, Nepean (CA); Louis-Rene Pare, St. Bruno (CA); Robert Caporuscio, Montreal (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/273,772

(22) Filed: Mar. 23, 1999

(51) Int. Cl.[7] .................................................. H04J 1/16
(52) U.S. Cl. ...................................... 370/404; 370/224
(58) Field of Search ................................ 370/216, 217, 370/218, 222, 223, 224, 225, 227, 228, 403, 404, 405, 406, 401, 395.1, 245, 241, 248, 249, 252, 254, 258, 256; 340/827, 825.01; 379/221; 398/8, 3, 2, 5, 6, 17, 19, 20, 33, 45, 50, 49, 56, 57, 58, 59

(56) References Cited

U.S. PATENT DOCUMENTS

| 5,623,482 A | * | 4/1997 | Okanoue | 370/224 |
|---|---|---|---|---|
| 5,909,175 A | * | 6/1999 | Yamasaki et al. | 370/223 |
| 5,982,869 A | * | 11/1999 | Lozano et al. | 379/222 |
| 6,295,146 B1 | * | 9/2001 | Nathan et al. | 370/224 |

* cited by examiner

Primary Examiner—Dang Ton

(57) ABSTRACT

A method and corresponding network element configuration for delivering communications services between first and second survivable rings, each comprising a respective plurality of network elements, at least two of which are common to both rings. For each particular service, one of the common network elements is designated as a primary gateway node and another as a secondary gateway node. A primary inter-ring connection is established for the particular service by a switch at the primary gateway node, but no inter-ring connection is established at the secondary gateway node. The secondary gateway node comprises a controller for monitoring the status of the primary gateway node and establishing a new inter-ring connection for delivery of said service upon detecting a failure of the primary gateway node. This provides survivable inter-ring traffic which is bandwidth-efficient and with a low switching delay.

18 Claims, 11 Drawing Sheets

METHOD AND APPARATUS FOR ENSURING SURVIVABILITY OF INTER-RING TRAFFIC

FIELD OF THE INVENTION

The present invention relates to the transmission of optical data and, in particular, to a method for ensuring the survivability of traffic travelling between adjacent rings.

BACKGROUND OF THE INVENTION

SONET, or Synchronous Optical NETwork, is now the preferred standard for optical transport of telecommunications traffic in North America. This standard has been developed and implemented over the last decade to give telecommunications carriers important benefits that are difficult to achieve using previously available asynchronous transport technology. Among the most significant of these advantages are: greater compatibility among equipment from different manufacturers; synchronous networking for improved reference timing of network elements; enhanced operations, administration and provisioning capabilities; and compatibility with any service mix including both traditional services and newer services such as Asynchronous Transfer Mode (ATM) traffic.

The SONET hierarchy is built upon a basic signal of 51.84 megabits per second (Mbps), known in the art as a level-1 synchronous transport signal frame, denoted STS-1 and sometimes referred to as a "time slot". A byte-interleaved multiplexing scheme can be applied to multiple STS-1 frames, resulting in a digital signal having a rate of N times the basic rate, where N is typically 1, 3, 12, 48 or 192. The optical form of an STS signal is called an optical carrier (OC) and thus an STS-N signal and an OC-N signal have the same rate.

The STS-1 frame has a portion of its capacity used for delivering payload, while the remaining portion is devoted to overhead. The payload refers to the data or traffic part of a signal, while the overhead consists of signalling and protocol information. The use of the SONET overhead allows communication between intelligent nodes in the network, which enables administration, surveillance, provisioning and control of the network to be carried out from a central location.

Today's SONET transport networks typically employ a number of different topologies to satisfy important objectives such as network simplicity, cost containment, bandwidth efficiency and survivability. For instance, an optical hubbing configuration may be used to eliminate the need for a costly and complicated arrangement consisting of several back-to-back network elements. Another example is the deployment of self-healing rings to assure survivability of traffic around the ring through the provision of redundant communications paths.

By way of example, a two-fiber bidirectional line-switched ring (2F BLSR) is a survivable SONET transport architecture that protects against cable cuts and node failures by providing duplicate, geographically diverse paths for each service to be delivered. In a 2F BLSR, the two fibers carry unidirectional traffic in opposite directions and the bandwidth of each unidirectional fiber is split between working traffic and protection traffic.

A service path is provisioned through a 2F BLSR by selecting endpoint network elements and one or more STS-1 time slots linking the service entry and exit points. Although two communication paths are available around the ring, a service reaches its destination by travelling along the working path of only one of these. Intermediate nodes on the service path, if they exist, simply pass the service from east to west (or vice versa) without modifying the STS-1 channel assignment.

In the event of a failure or degradation of an optical span, the automatic ring protection switching functionality of SONET reroutes affected traffic away from the fault within 50 milliseconds in order to prevent a service outage. Traffic is redirected by looping back STS-1 time slots across the protection path in the other direction. The normally unused protection bandwidth thus forms a logical bridge over the defective span, thereby maintaining service for all terminating and pass-through traffic.

Another characteristic of the 2F BLSR architecture is that it allows individual STS-1 channels to be reused as traffic is terminated at various locations around the ring. This feature makes the 2F BLSR architecture ideally suited to the mesh and node-to-adjacent-node traffic patterns found in interoffice networks and also in certain types of access networks. The reuse of STS-1 channels also offers important bandwidth synergies in ATM networks.

In a four-fiber (4F) BLSR, two pairs of unidirectional fibers link adjacent nodes in the ring. One fiber pair exclusively carries working traffic while the other pair serves as a protection facility. If a fault affects a working fiber along a span, traffic is rerouted along the corresponding protection fiber. If the fault affects both the working and protection fibers, automatic ring protection switching redirects traffic in a manner similar to a 2F BLSR. However, instead of looping back time slots within the same fiber pair as in a 2F BLSR, traffic is transferred from the working pair to the protection pair.

In many cases, it is desirable to exchange information not only between nodes in a ring but also between nodes located in separate rings. Using SONET, adjacent rings are easily connected to one another by virtue of arranging one or more nodes from each ring to communicate as gateway nodes. While the above-described route diversity fully protects all working traffic passing from node to node along an individual ring, service paths must nevertheless be protected on an end-to-end basis. This means that survivable inter-ring connections are required as traffic passes through the designated gateway nodes from the ring serving the entry point to the ring serving the termination point.

To this end, protection of inter-ring traffic can be provided by the SONET "matched nodes" configuration, in which redundant (i.e., duplicate) routing is provided across inter-ring boundaries. For example, FIG. 1 illustrates a matched nodes configuration as applicable to two 2F BLSR rings wishing to communicate with one another. Node 6 in ring 2 and "matched" node 14 in ring 8 have been chosen as primary gateway nodes, while node 10 in ring 2 and "matched" node 16 in ring 8 have been configured as secondary gateway nodes.

Within primary gateway node 6, a drop-and-continue router 4 is used for duplicating a working signal and forwarding copies of the signal to secondary gateway node 14 in ring 8 as well as to secondary gateway node 10 within ring 2. Secondary gateway node 10 is equipped with means for forwarding the received copy to secondary gateway node 16 in ring 8, which then sends the copy to primary gateway node 14. Thus, under normal operating conditions, primary gateway node 14 in ring 8 receives two copies of the signal transmitted by primary gateway node 6 in ring 2. In FIG. 1, the duplicate paths between the two rings are shown as a thick solid line.

Of course, both copies of the delivered service are not required at the primary gateway node 14 in ring 8. For this reason, node 14 is equipped with a service selector 12 that chooses one of the copies as a function of signal integrity, which can be inferred from standard parameters such as the line and/or path alarm indication signal (AIS). For the explanatory purposes, it is assumed that the service selector 12 is programmed to select the "primary" inter-ring signal arriving directly from node 6 rather than the "secondary"inter-ring signal arriving via node 16.

In the event of a failure within either ring (e.g., a fiber fault along lines B–B'or C–C' in FIG. 1), the matched nodes configuration provides no significant benefit, as the automatic ring protection switching facility of SONET will cause the working signals to be looped back over the appropriate protection path in the respective ring. Rather, the classical advantage of the matched nodes configuration is that inter-ring traffic is protected in the event of a failure on the inter-ring span between primary gateway nodes 6 and 14, e.g., a fiber fault along lines A–A' in FIG. 1.

In the latter case, node 14 notices that the primary inter-ring signal arriving from node 6 is lost and switches its service selector 12 to the secondary inter-ring signal arriving from node 16. Although the primary inter-ring signal was lost, the secondary inter-ring signal remains unaffected by the fiber fault. For this reason, the matched nodes configuration is often used for providing survivable connections between rings.

However, the matched nodes configuration is afflicted with several serious drawbacks which make it a rather unsatisfactory choice for ensuring the protection of inter-ring traffic. Firstly, duplication of the data signal by the drop-and-continue router 4 within primary gateway node 6 results in a waste of bandwidth under non-fault operating conditions. If other network elements were connected between nodes 6 and 10, for example, then the bandwidth available to carry traffic destined for (or originating from) such intermediate nodes would be notably reduced relative to the working bandwidth available in the absence of matched nodes.

A second problem arises due to the reliance of the service selector 12 within node 14 upon the integrity of the primary inter-ring signal received from node 6. Specifically, it is noted that at least two distinct scenarios may result in loss of the primary inter-ring signal. One of these is a fiber fault along lines A–A' in FIG. 1, which clearly necessitates a quick reaction by the service selector 12 in order to avoid a prolonged outage. In a second instance, the primary inter-ring signal can also be lost due to a failure on ring 2 along lines B–B'. However, the standard automatic ring protection switching functionality inherent to the design of the ring 2 will cause the "lost" signal to be looped back around the protection path of ring 2 and delivered, uncorrupted, to node 6 via node 10.

Therefore, in order to avoid prematurely switching the service selector 12, it is necessary for the secondary gateway node 14 to pause upon initial detection of a loss of the primary inter-ring signal in order to determine whether the signal loss is indeed irreparable. The length of this pause, known as the "hold off" time for matched nodes, has been specified to be 100 milliseconds in Bellcore standard GR-1230, issue 3, chapter 7, hereby incorporated by reference herein. Clearly, if the signal loss truly is due to a fault along line A–A', then the 100 millisecond hold off time disadvantageously results in an unnecessary outage, with consequences ranging from mild to severe for the telecommunications service provider.

A third drawback of matched nodes becomes apparent when considering the connection of a large number of lower-capacity rings to a common main ring. When using the matched nodes configuration, each additional ring requires two of its nodes to be equipped with matched nodes functionality. Depending on the number of fibers and the capacity of each ring, the number of additional rings can be quite large (up to 32 2F OC-12 rings or up to 8 OC-48 rings connected to a single 4F OC-192 BLSR), leading to an exorbitant number of network elements having to be equipped with matched nodes capability.

The background information provided above clearly indicates that there exists a need in the industry to provide a method and apparatus for enabling the survivability of interring traffic which is faster, more bandwidth efficient and better integrated than the solutions currently applied in the industry.

SUMMARY OF THE INVENTION

It is an object of the present invention to obviate or mitigate one or more disadvantages of the prior art.

The invention may be summarized according to one broad aspect as a method and corresponding network element configuration for delivering communications services between first and second survivable rings. Each ring comprises a respective plurality of network elements and at least two of these are common to both rings, among which one is designated as a primary gateway node and another is designated as secondary gateway node, for each service to be delivered. A primary inter-ring connection is established for a particular service by a switch at the primary gateway node, but no inter-ring connection is established at the secondary gateway node. A controller in the secondary gateway node monitors the status of the primary gateway node and, upon detecting a failure of the primary gateway node, establishes a new inter-ring connection for delivering the service.

The status of the primary gateway node may be communicated along a control channel shared by the various nodes in each ring. The rings themselves may be two-fiber or four-fiber BLSRs and there may be more than one ring joined to a main ring in a "subtending rings" configuration.

The invention may be summarized according to another broad aspect as a computer-readable storage medium containing software that, when running on a processor, follows a sequence of steps to control a switch in a network element, the switch being operable to controllably establish an inter-ring connection between first and second rings. The steps comprise monitoring the status of another network element and establishing an inter-ring connection upon failure of the other network element.

BRIEF DESCRIPTION OF THE DRAWINGS

The preferred embodiment of the present invention will now be described with reference to the accompanying drawings, in which.

DETAILED DESCRIPTION OF THE PREFERRED EMBODIMENT

Firstly, to reduce the number of nodes that are required to provide inter-ring connections, the concept of subtending rings is introduced. A subtending ring configuration is an advanced multi-ring configuration in which a node's tributary or line optics support one or more secondary rings. This arrangement offers substantial capital savings as well as network simplification at a central office hub by allowing a single network element to serve in place of multiple collocated shelves.

Figure 1:
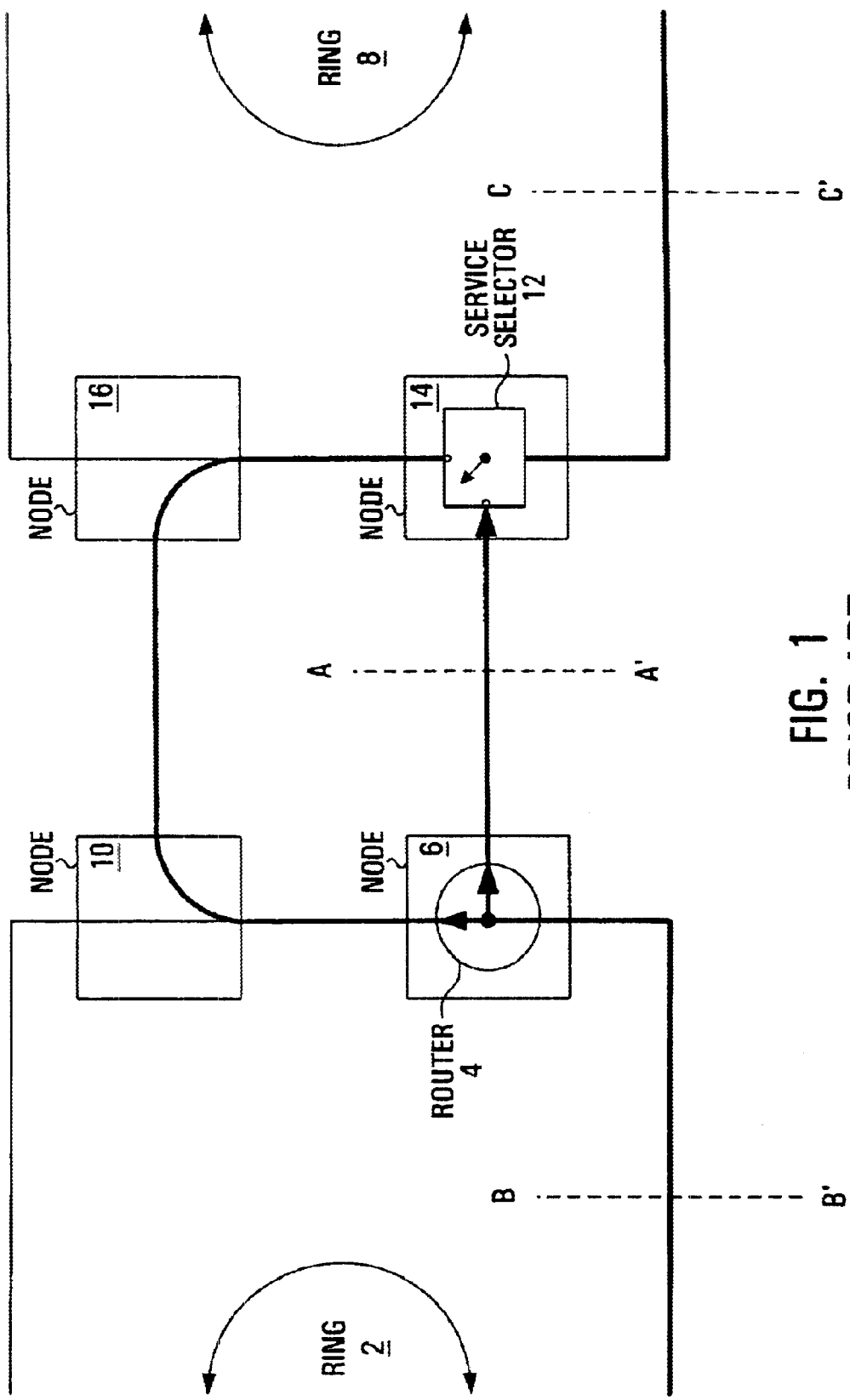
FIG. 1 shows in schematic form a "matched nodes" configuration according to the prior art.
Figure 2:
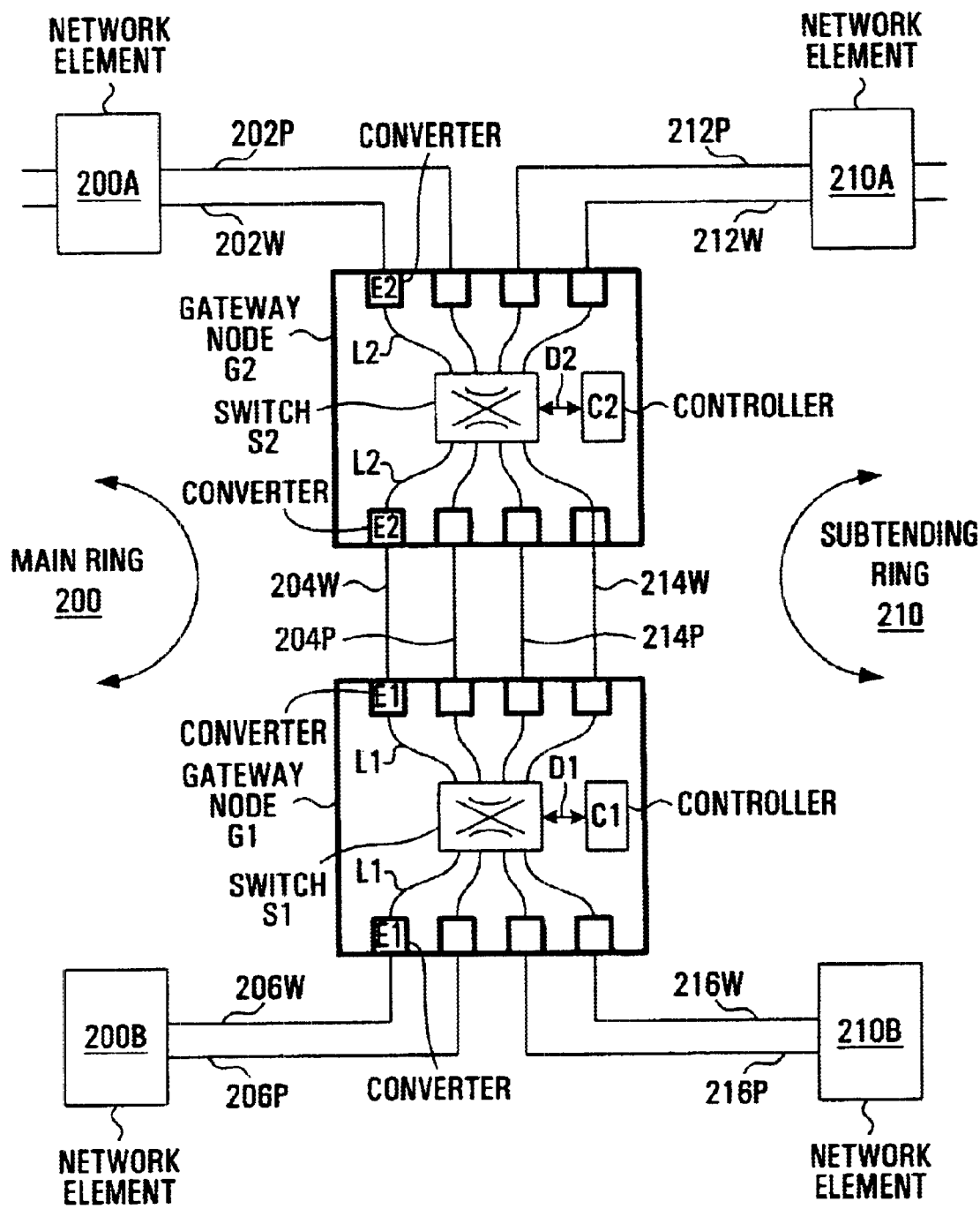
FIG. 2 shows in schematic form a subtending ring configuration in accordance with the preferred embodiment of the invention.

Referring to FIG. 2, there is shown a main ring 200 comprising a plurality of network elements, among which network elements 200A, 200B, G1 and G2 are shown interconnected by fiber optic spans. Network elements G1 and G2 are configured as gateway nodes for providing inter-ring connections between the main ring 200 and a subtending ring 210. The subtending ring 210 also consists of a plurality of interconnected network elements, including the two common gateway nodes G1,G2 as well as individual network elements indicated at 210A and 210B.

Both rings 200,210 are survivable rings, i.e., they possess an automatic ring protection switching functionality, allowing each ring to maintain survivable traffic within the respective. ring. Suitable survivable topologies for the main ring 200. and the subtending ring 210 are the two-fiber BLSR and four-fiber BLSR architectures.

As mentioned, the fiber optic spans linking the network elements of a 2F BLSR would consist of a pair of unidirectional fiber segments, each fiber segment carrying both working and protection traffic in the same given direction. In the case of a 4F BLSR, the spans would each consist of a pair of unidirectional working fiber segments and a pair of unidirectional protection fiber segments.

Nevertheless, in the interest of simplifying the drawing, FIG. 2 generically shows the working path in the main ring 200 as consisting of bidirectional fiber segments 202W, 204W, 206W, the protection path in the main ring 200 as consisting of bidirectional fiber segments 202P, 204P, 206P, the working path in the subtending ring 210 as consisting of bidirectional fiber segments 212W, 214W, 216W and the protection path in the subtending ring 210 as consisting of bidirectional fiber segments 212P, 214P, 216P. It should be appreciated that a suitable number of fibers, dependent on the type of ring used, is to be used when implementing the invention. It should also be understood that more than one subtending ring may be connected to the gateway nodes and that the subtending rings may be of any type or capacity.

The network elements other than gateway nodes G1 and G2 can be standard network elements within the context of SONET networking. As a consequence of being part of a survivable ring, the network elements are equipped with automatic ring protection switching functionality for handling failures occurring within the ring to which the network element belongs. The gateway nodes G1,G2 are also equipped with this automatic ring protection switching capability but, in accordance with the invention, are additionally capable of ensuring the survivability of inter-ring traffic in the event of gateway node failures as will be further described hereinbelow.

With specific reference to FIG. 2 and gateway node G1 in particular, the latter comprises a switch S1, a memory (not shown), a controller C1 and various opto-electronic converters, partly shown at El. The opto-electronic converters El are of standard design and are used for converting incoming optical OC-N signals arriving via optical fiber segments 204W, 204P, 206W, 206P, 214W, 214P, 216W and 216P into electronic STS-N signals and for converting outgoing electronic signals into optical ones for transmission to other network elements along the optical fiber segments.

The switch S1 is preferably a controllable digital electronic switch for routing STS-1 (or higher-level) frames of SONET traffic from any fiber segment to any other fiber segment. Of course, consideration is to be given as to the type (2F BLSR, a 4F BLSR, etc.) and capacity of the main and subtending rings, which have a bearing on switch capacity and the number of ports required in the switch.

Routing is effected by the switch S1 in accordance with switching instructions received from the controller C1, to which it is connected via a control line D1. Most STS-1 signals arriving at the switch S1 will carry traffic frames, which are routed by the switch S1 towards the appropriate opto-electronic converter El via the corresponding signal line L1.

In addition, it is desirable that at least one incoming and outgoing STS-1 (or higher-level) signal serve as a control channel for transmitting operation, administration, maintenance and provisioning (OAM&P) information to and from controller in each gateway node. Accordingly, the switch S1 routes the incoming OAM&P information to the controller C1 via control line D1 and also receives outgoing OAM&P information from the controller C1, which it then routes towards the appropriate opto-electronic converters El via the signal lines L1, for transmission across the corresponding fiber segments.

The OAM&P information preferably includes the status of various network elements in both survivable rings. Those skilled in the SONET networking art will recognize that it is standard practice to provide an indication of whether a given network element is "failed" or "not failed". In addition, the OAM&P information preferably comprises initial switching instructions to be executed by the switch S1 upon setup of a service connection and to be maintained throughout the duration of the service under normal (i.e., non-fault) conditions.

The controller C1 may be a micro-controller, a digital signal processor (DSP), an application-specific integrated circuit (ASIC) or any other type of programmable logic device. The controller C1 generates switching instructions for the switch S1 based on OAM&P information received therefrom via the control line D1. The controller C1 also generates and/or forwards OAM&P information, which it passes to the switch S1 along the control line D1.

Generation of the switching instructions is achieved by the controller C1 executing program instructions contained in the memory, which may in fact be internal to the controller. One a service-by-service basis, the switching instructions provided to the switch S1 are essentially the same as the initial switching instructions (forming part of the OAM&P information) when there are no detected faults in the system. However, the initial switching instructions will be over-ridden under fault conditions.

The above discussion applies analogously to gateway node G2, which also comprises a switch S2, a memory (not shown), a controller C2 connected to the switch S2 by control line D2 and a plurality of opto-electronic converters E2 connected to the switch S2 by respective signal lines L2. The controller C2 similarly executes an algorithm, possibly stored as a software program in the memory, to generate switching instructions for the switch S2.

While the structure of the two gateway nodes G1,G2 is indeed quite similar, there are differences as to the content of the program code containing instructions for generating the switching instructions to control the respective switch. These differences are now considered in the context of an operational description of the gateway nodes.

As required for the delivery of inter-ring services, the switches S1,S2 in gateway nodes G1,G2 have the capability to pass traffic between rings. According to the invention, only one of these gateway nodes (the "primary gateway node") is chosen to provide the inter-ring connection, while the other gateway node is known by default as the "secondary gateway node". It is to be appreciated that the gateway node provisioned as a primary gateway node for one inter-ring service may be provisioned as'a secondary gateway node for another inter-ring service, as needed for most efficient utilization of the rings'available bandwidth. Therefore, without loss of generality, one may consider the delivery of a single service and choose gateway nodes G1 and G2 as the primary and secondary gateway nodes, respectively.

Figure 3A:
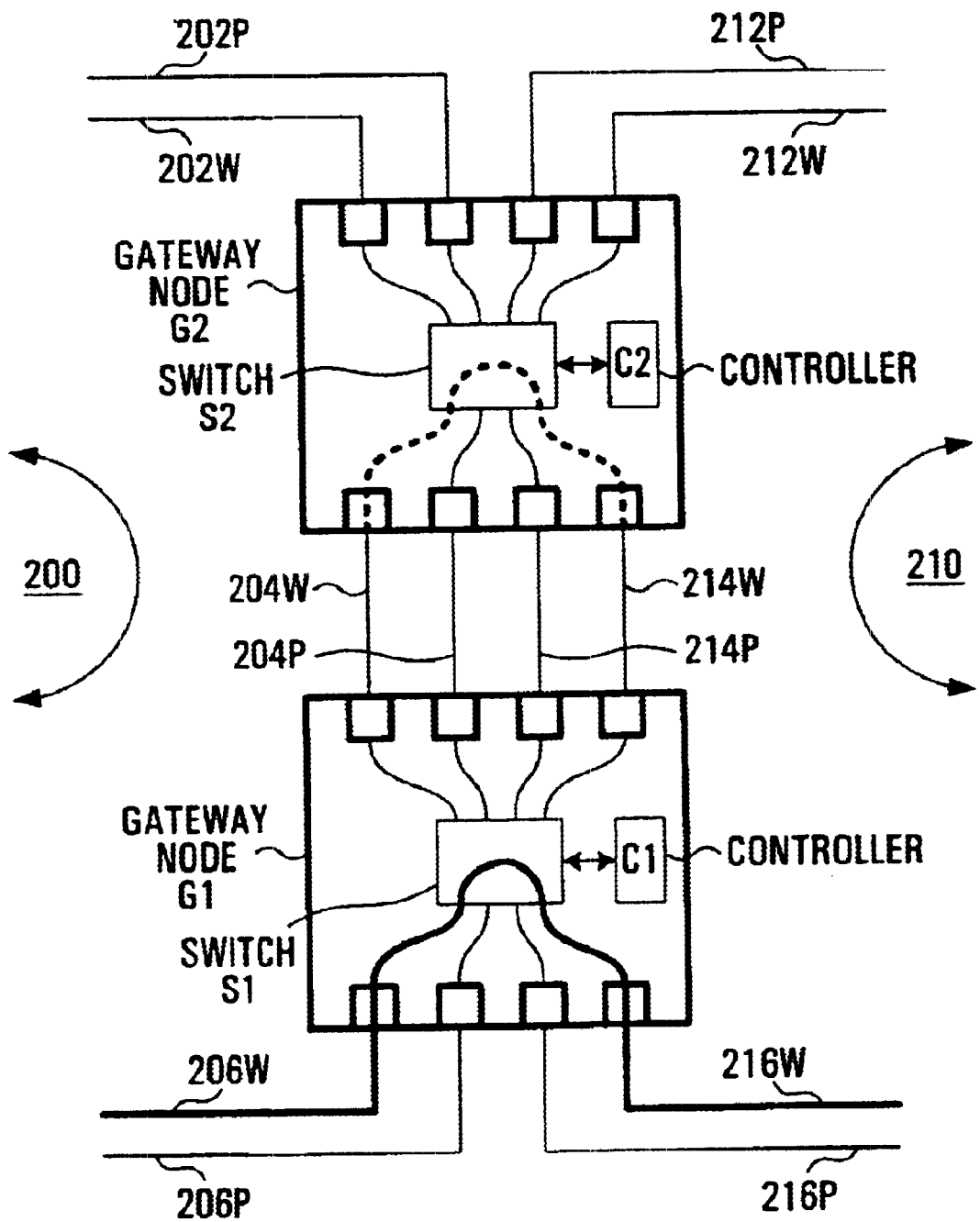
FIG. 3A illustrates the first of three scenarios for providing survivable inter-ring traffic in accordance with the preferred embodiment of the invention, in which there is established a primary inter-ring connection through a primary gateway node and a "shadow" inter-ring connection at a secondary gateway node.
Figure 4A:
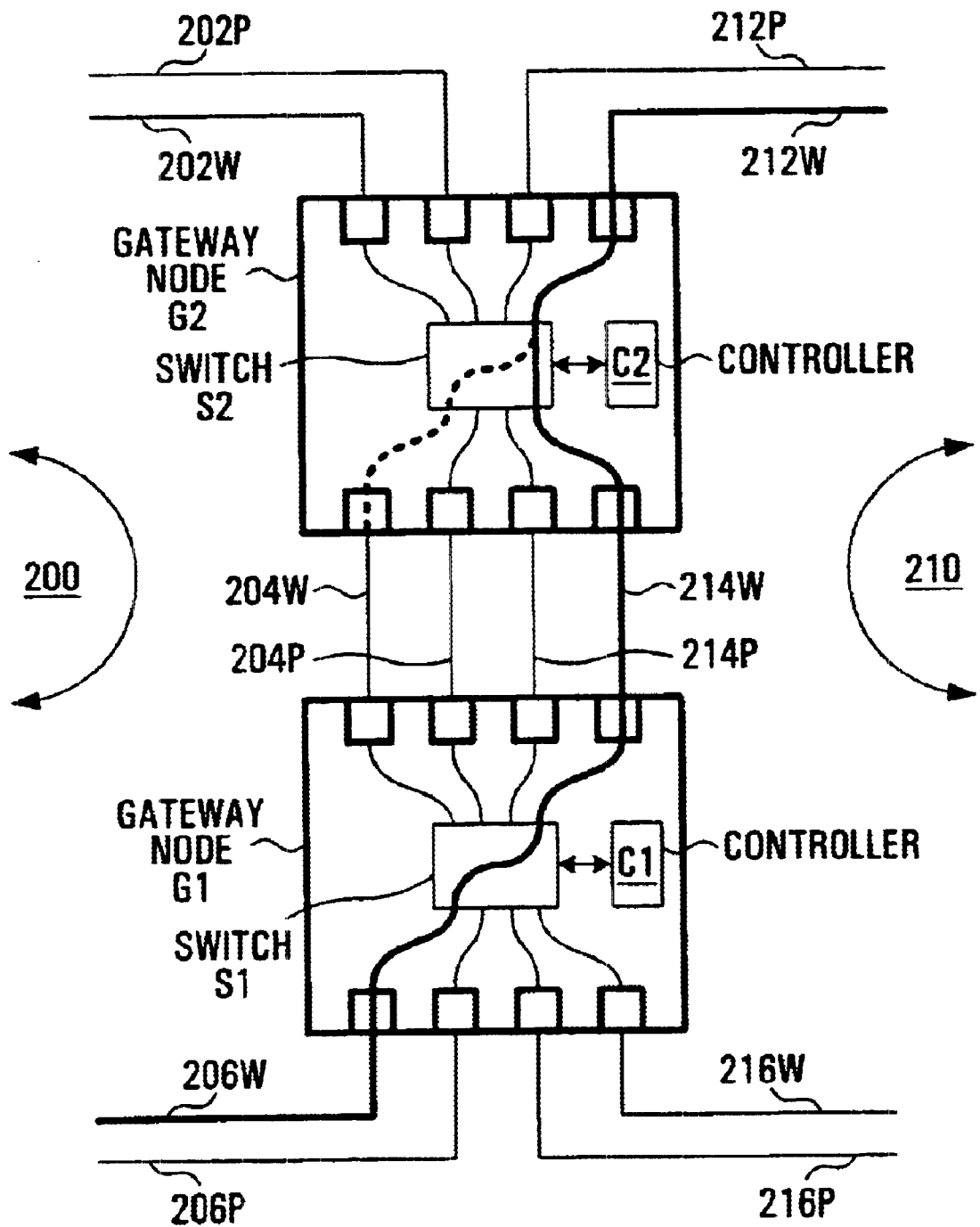
FIG. 4A illustrates the second of three scenarios for providing survivable inter-ring traffic in accordance with the preferred embodiment of the invention, in which there is established a primary inter-ring connection through a primary gateway node and a "shadow" inter-ring connection at a secondary gateway node.
Figure 5A:
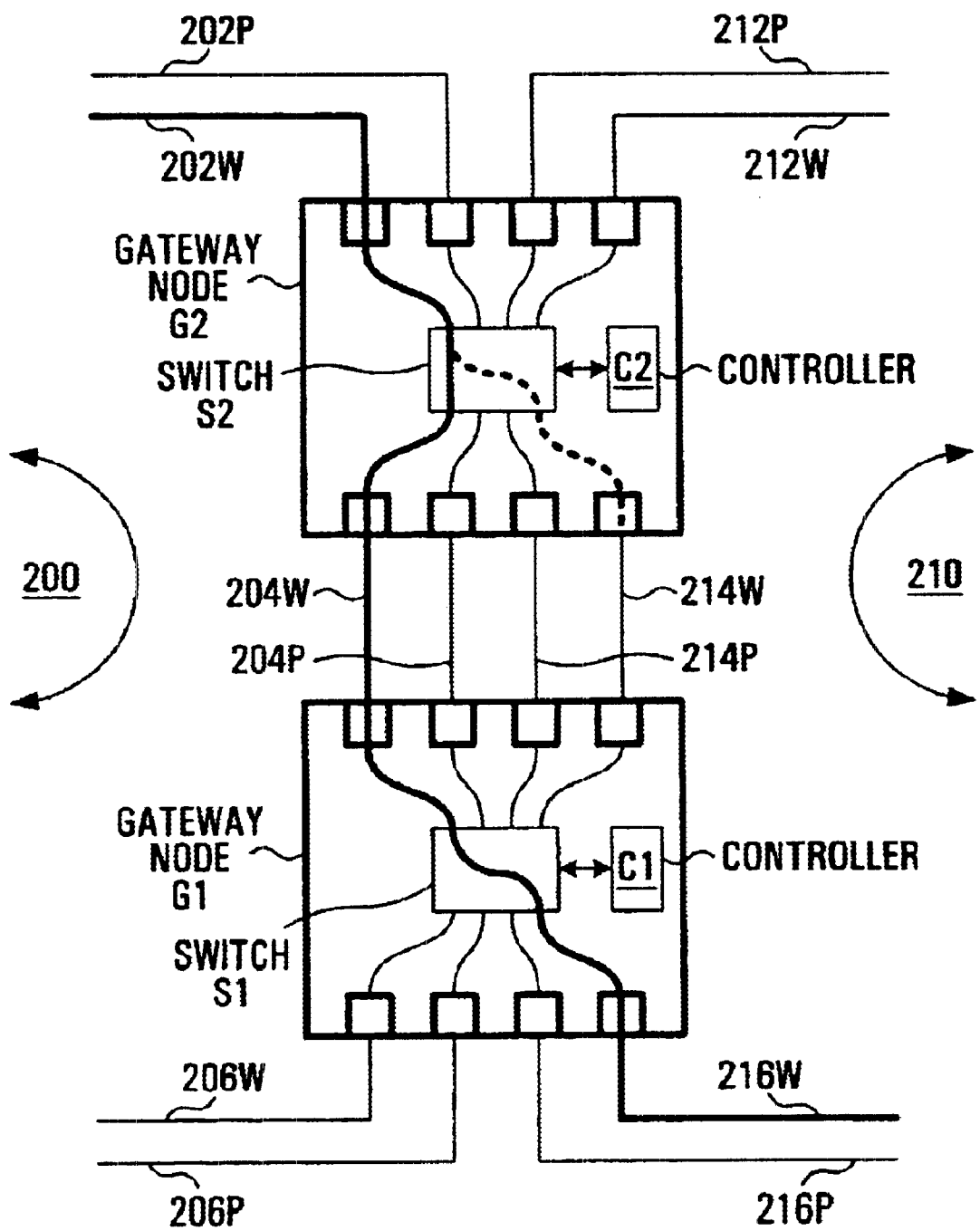
FIG. 5A illustrates the third of three scenarios for providing survivable inter-ring traffic in accordance with the preferred embodiment of the invention, in which there is established a primary inter-ring connection through a primary gateway node and a "shadow" inter-ring connection at a secondary gateway node.

FIGS. 3A, 4A and 5A show three possible scenarios in which the primary gateway node G1 can establish an inter-ring connection. With specific reference to FIG. 3A, the switch S1 in the primary gateway node G1 is initially provisioned to establish a primary inter-ring connection (thick solid line) between working segment 206W from the main ring 200 and working segment 216W from the subtending ring 210. It is noted that the switch S1 does not establish a redundant connection between segments 206W and 204W or between segments 216W and 214W. In this way, the bandwidth along segments 204W and 214W remains available, e.g., for use by future intermediate nodes.

The secondary gateway node G2, on the other hand, is provisioned not to effect an inter-ring connection for this particular service. That is to say, OAM&P information provided to the controller C2 indicates that the switch S2 is to not establish an inter-ring connection, since a primary inter-ring connection is already established by the primary gateway node G1. Rather, the algorithm run by the controller C2 requires monitoring of the status of the primary gateway node G1. A convenient way to visualize the monitoring process from the perspective of the controller C2 in the secondary gateway node G2 is to imagine that a "shadow" inter-ring connection (shown in FIG. 3A as a thick dotted line) is established through the secondary gateway node G2.

If the status of the primary gateway node G1 is "not failed", then the algorithm provides that controller C2 inform the switch S2 that there is still no inter-ring connection to be established for this particular service. However, if the status of the primary gateway node G1 is "failed", then the controller C2 instructs the switch S2 to connect the protection segment 202P of the main ring 200 to the protection segment 212P of the subtending ring 210.

Figure 3B:
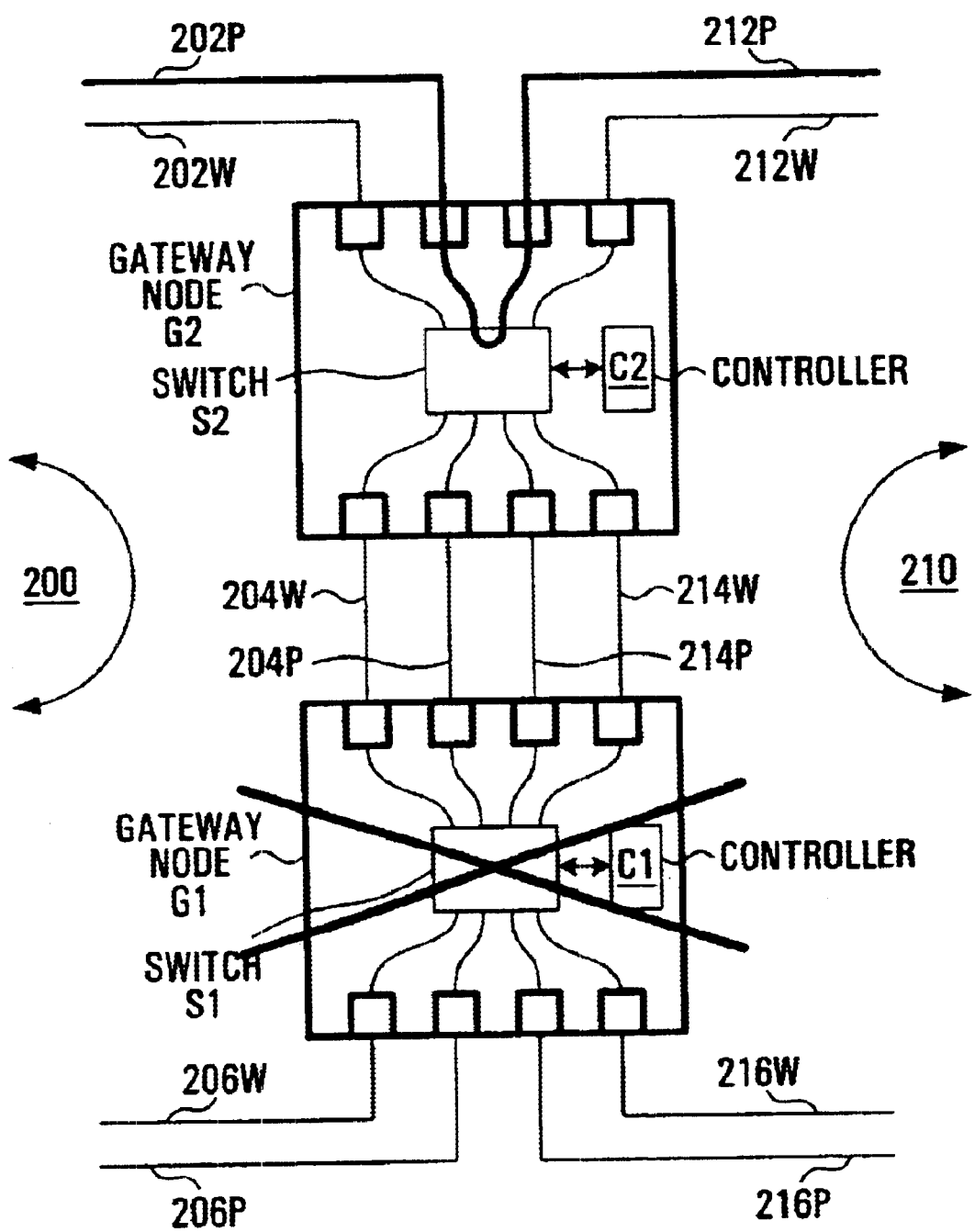
FIG. 3B shows establishment of a new inter-ring connection through the secondary gateway node upon failure of the primary gateway node in FIG. 3A, in accordance with the preferred embodiment of the invention.

It is now shown that survivability of inter-ring traffic is ensured by the just described algorithm as applied to various failure situations. Failure of the primary gateway node G1 is first considered with additional reference to FIG. 3B. Since either ring 200,210 taken individually is survivable, the signal formerly headed for the primary gateway node G1 along working segment 206W will be looped back around the protection path of ring 200 and will arrive at the secondary gateway node G2 via protection fiber 202P. Similarly, the signal formerly arriving at the primary gateway node G1 along working segment 216W will be looped back around the protection path of ring 210 and will arrive at the secondary gateway node G2 via protection fiber 212P.

Thus, connecting the protection segment 202P of the main ring 200 to the protection segment 212P of the subtending ring 210 in accordance with the invention establishes a new inter-ring connection (shown as a thick solid line in FIG. 3B) which ensures the survivability of inter-ring traffic. Moreover, rerouting the new inter-ring connection established over the protection segments 202P, 212P does not affect working segments 202W, 212W or inter-gateway working segments 204W, 214W. Segments 202W, 212W are therefore free to be used as a primary inter-ring connection for another service, regardless of the status of the primary gateway node G2.

Furthermore, inter-gateway working segments 204W, 214W are free to transport traffic to and from intermediate nodes located between the primary and secondary gateway nodes G1,G2. Failure of the primary gateway node G1 does not affect the delivery of such intermediate traffic. Failure of both the primary gateway node and the intermediate node automatically initiates the standard operation of squelching the intermediate traffic and/or the inter-ring traffic which compete from the same protection bandwidth on segment 202P.

Figure 3C:
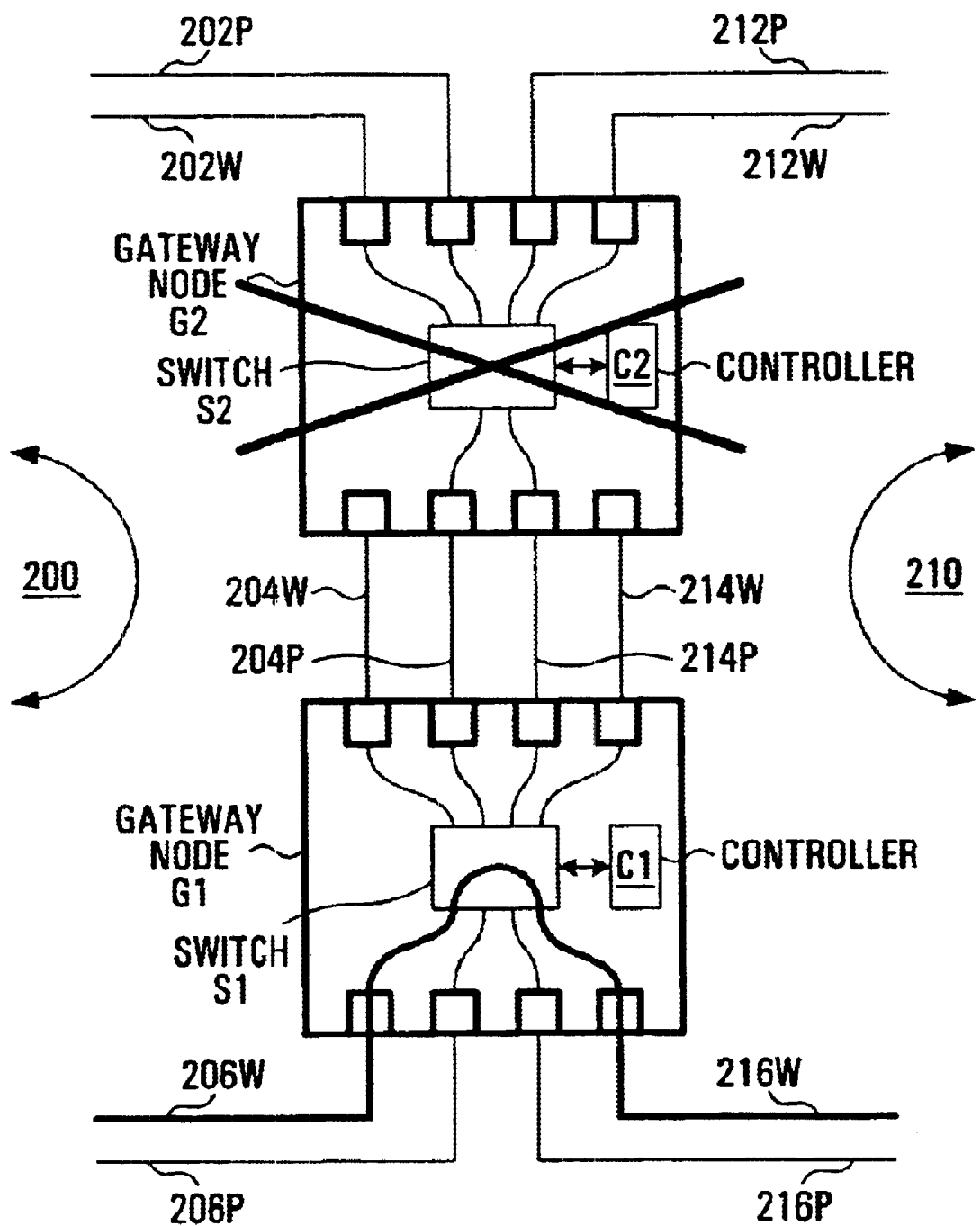
FIG. 3C shows immunity of the primary inter-ring connection established through the primary gateway node in FIG. 3A to a failure of the secondary gateway node.

Of course, failure of the secondary gateway node G2 must also be dealt with. However, as is shown more clearly in FIG. 3C, the fact that the primary inter-ring connection (shown as a thick solid line) established by the primary gateway node G1 is isolated from gateway node G2 means that this first scenario for providing an inter-ring connection is immune to failures of the secondary gateway node G2.

FIG. 4A shows another scenario in which the primary gateway node G1 provides a primary inter-ring connection. In this case, the switch S1 in the primary gateway node G1 is initially provisioned to establish a primary inter-ring connection (shown as a thick solid line) between working segment 206W from the main ring 200 and inter-gateway working segment 214W from the subtending ring 210. It is noted that the switch S1 does not establish a redundant connection between segments 206W and 204W, thereby liberating the bandwidth along segment 204W.

The switch S2 in the secondary gateway node G2 is initially provisioned to establish a connection (the continuation of the thick solid line) between working segments 212W and 214W of the subtending ring 210 but this connection is not an inter-ring connection for this particular service because a primary inter-ring connection has already been established by the primary gateway node G1.

Again, the algorithm being executed by the controller C2 requires monitoring the status of the primary gateway node G1. This can be visualized as forming a "shadow" inter-ring connection (shown in FIG. 4A as a thick dotted line) at the secondary gateway node G2. If the status of the primary gateway node G1 is "not failed", then the controller C2 informs the switch S2 that the only required connection for this service is the connection between working segments 212W and 214W, which is already in place. There is still no inter-ring connection to be established by the secondary gateway node G2 for this particular service. However, if the status of the primary gateway node. G1 is "failed", then the controller C2 instructs the switch S2 to connect the protection segment 202P of the main ring 200-to the working segment 212W of the subtending ring 210.

Figure 4B:
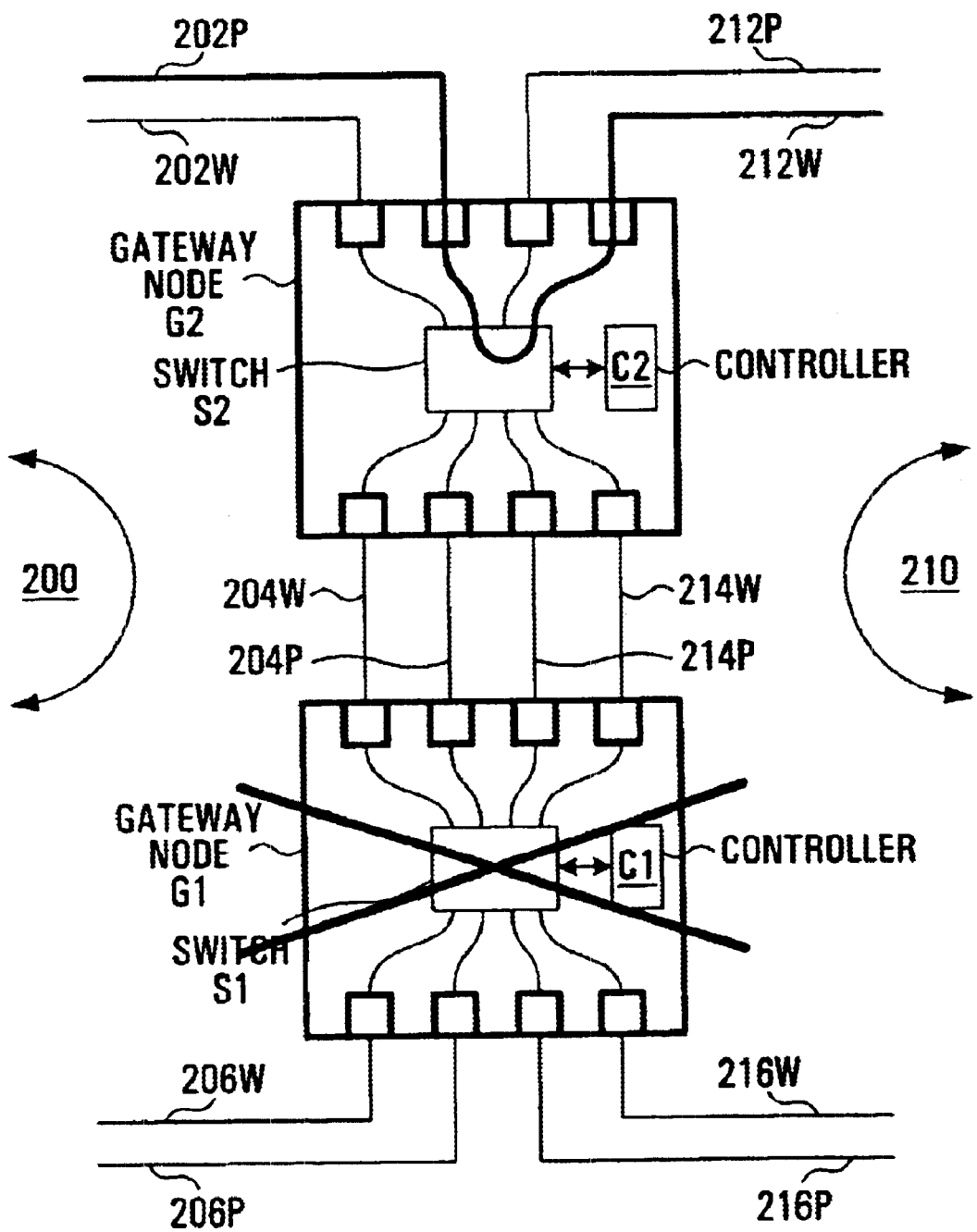
FIG. 4B shows establishment of a new inter-ring connection through the secondary gateway node upon failure of the primary gateway node in FIG. 4A in accordance with the preferred embodiment of the invention.

Survivability of inter-ring traffic is ensured by the just described algorithm as applied to various failure situations. Firstly, a failure of the primary gateway node G1 is considered with additional reference to FIG. 4B. In this case, due to the survivability of the main ring 200, the signal formerly arriving at the primary gateway node G1 along working segment 206W will be looped back around the protection path of ring 200 and will arrive at the secondary gateway node G2 via protection fiber 202P. However, the traffic on working segment 212W will remain intact.

Thus, connecting the protection segment 202P of the main ring 200 to the working segment 212W of the subtending ring 210 in accordance with the invention establishes a new inter-ring connection (shown as a thick solid line in FIG. 4B) which ensures the survivability of inter-ring traffic. Moreover, rerouting the new inter-ring connection established over protection segment 202P does not affect working segment 202W or inter-gateway working segment 204W. Segment 202W is therefore free to be used as part of a primary inter-ring connection for a different service, regardless of the status of the primary gateway node G2.

Furthermore, inter-gateway working segment 204W is free to transport traffic to and from intermediate nodes located between the primary and secondary gateway nodes G1,G2 along ring 200. Failure of the primary gateway node G1 does not affect the delivery of such intermediate traffic, while failure of the primary gateway node and of the intermediate node requires the standard squelching of the intermediate traffic or of the inter-ring traffic competing for protection bandwidth.

Figure 4C:
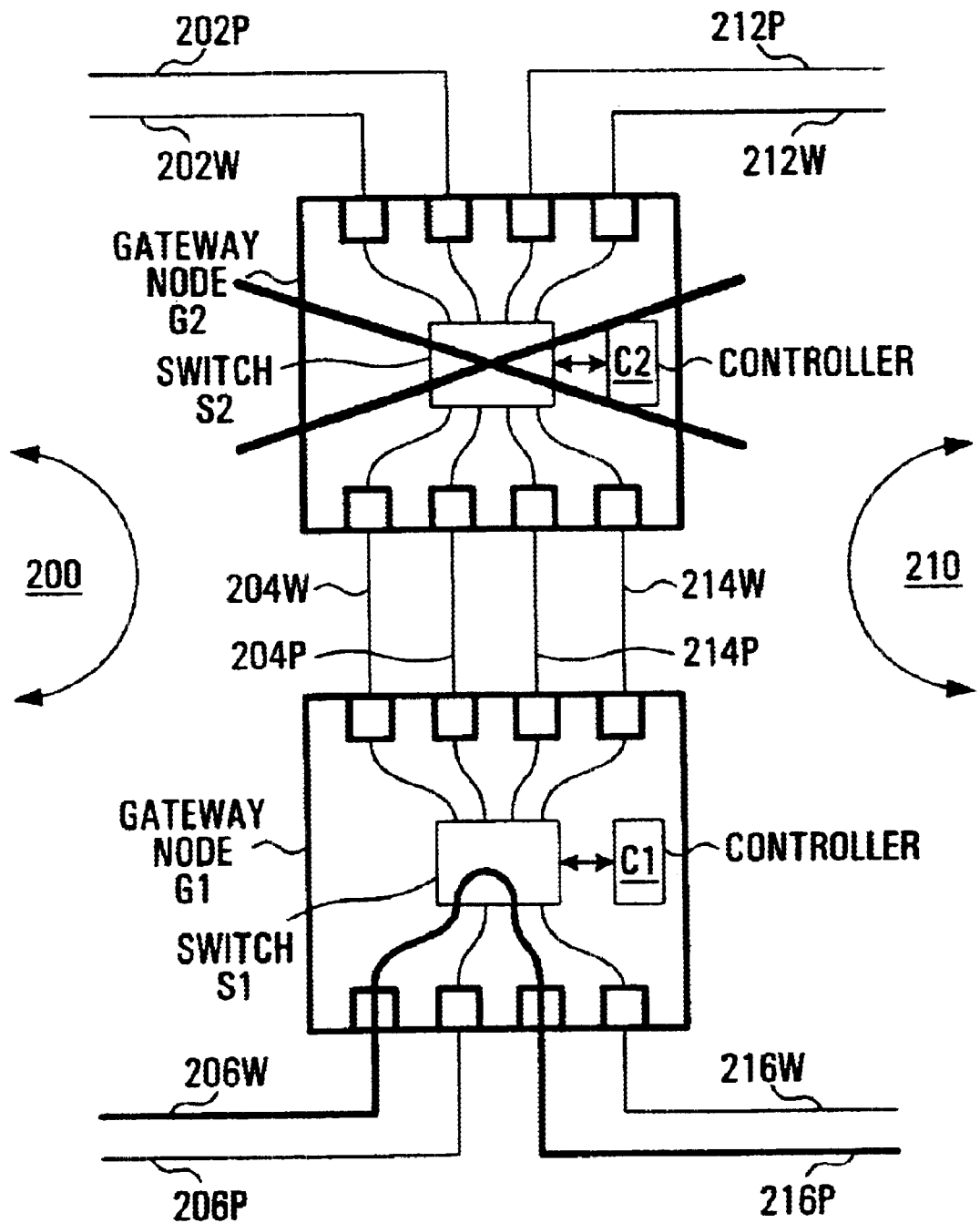
FIG. 4C shows how the primary gateway node in FIG. 4A maintains an inter-ring connection in the event of a failure of the secondary gateway node.

Naturally, a failure of the secondary gateway node G2 must also be considered and to this end, reference is now made to FIG. 4C. In the event of a failure of gateway node G2, standard automatic ring protection switching will cause the traffic formerly on working segment 212W to be looped back to the primary gateway node G1 via protection segment 216P. Since the primary gateway node G1 is itself equipped with standard automatic ring protection switching capability, the controller C1 automatically provides switching instructions to the switch S1 which then communicates with protection segment 216P instead of working segment 214W. The thick solid line in FIG. 4C shows that an inter-ring connection continues to be provided by the primary gateway node G1 in the event of a failure of the secondary gateway node G2.

Finally, in FIG. 5A is shown the third way in which the primary gateway node G1 can establish an inter-ring connection for a particular service. In this case, the switch S1 in the primary gateway node G1 is initially provisioned to establish a primary inter-ring connection (shown as a thick solid line) between inter-gateway working segment 204W from the main ring 200 and working segment 216W from the subtending ring 210. It is noted that the switch Si does not establish a redundant connection between segments 216W and 214W, thereby freeing the bandwidth along segment 214W.

The switch S2 in the secondary gateway node G2 is initially provisioned to establish a connection between working segments 202W and 204W of the main ring 200. However, switch S1 is instructed not to establish an inter-ring connection for this particular service, since a primary inter-ring connection has already been established by the primary gateway node G1. As usual, the controller C2 is required to monitor the status of the primary gateway node G1, which can be visualized as forming a "shadow" inter-ring connection at the secondary gateway node G2, which is depicted as a thick dotted line in FIG. 5A.

If the status of the primary gateway node G1 is "not failed", then the controller C2 informs the switch S2 that the only connection for this service is the connection between working segments 202W and 204W, which is already in place. There is still no inter-ring connection to be established by the secondary gateway node G2 for this particular service. However, if the status of the primary gateway node G1 is "failed", then the controller C2 instructs the switch S2 to connect the working segment 202W of the main ring 200 to the protection segment 212P of the subtending ring 210.

To demonstrate that execution of the algorithm does in fact ensure survivability of inter-ring traffic, one must consider the situation in which the primary gateway node G1 fails. In this case, with further reference to FIG. 5B, standard automatic ring protection switching provides that the traffic formerly on working segment 216W will be looped back around the protection path of ring 200 and will arrive at the secondary gateway node G2 via protection segment 212P. However, the traffic on working segment 202W will remain intact.

Figure 5B:
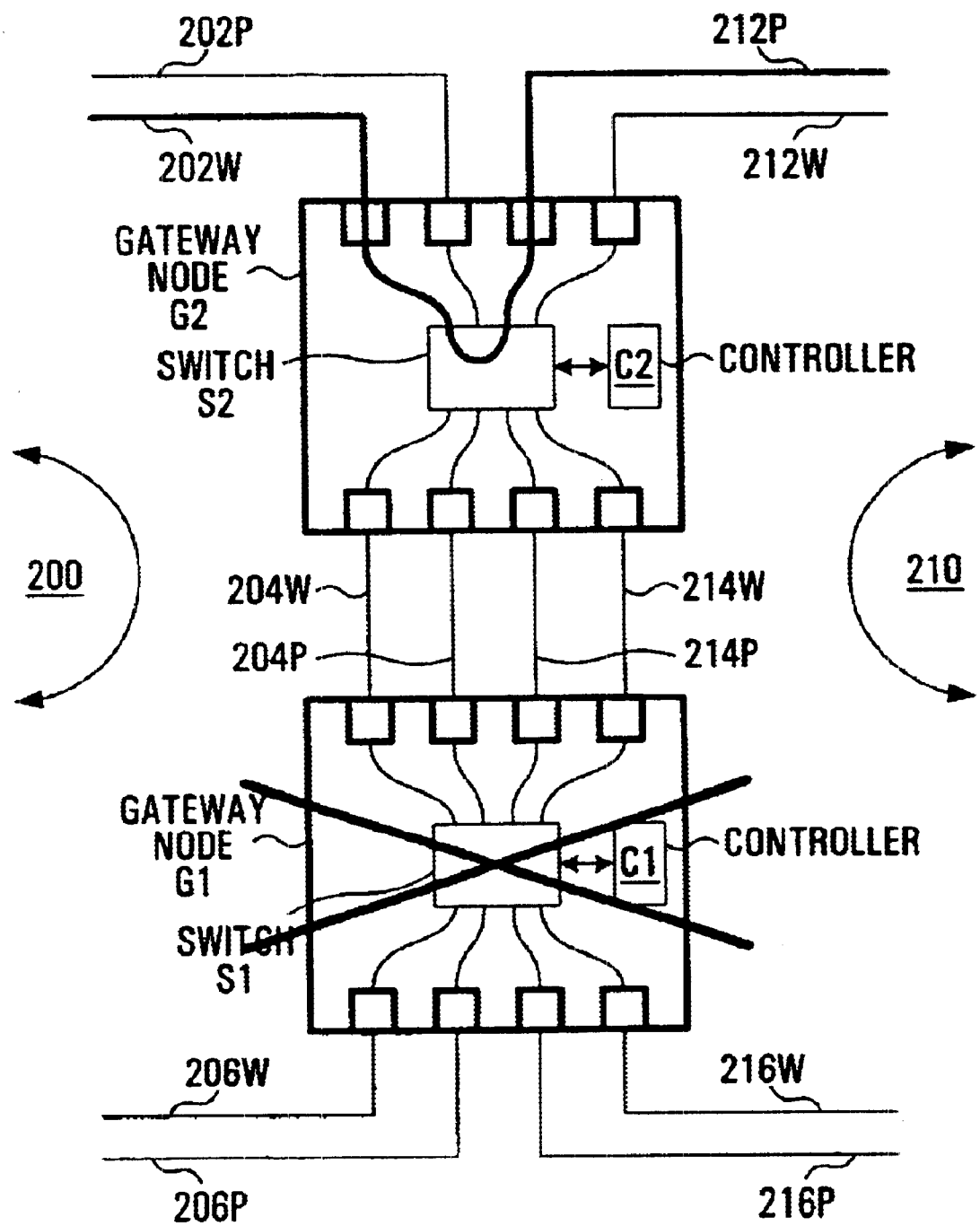
FIG. 5B shows establishment of a new inter-ring connection through the secondary gateway node upon failure of the primary gateway node in FIG. 5A in accordance with the preferred embodiment of the invention.

Thus, connecting the working segment 202W of the main ring 200 to the protection segment 212P of the subtending ring 210 in accordance with the preferred embodiment of the invention establishes a new inter-ring connection, shown as a thick solid line in FIG. 5B, which ensures the survivability of inter-ring traffic. Moreover, rerouting the new inter-ring connection established over protection segment 212P does not affect working segment 212W or inter-gateway working segment 214W. Segment 212W is therefore free to be used as part of a primary inter-ring connection for a different service, regardless of the status of the primary gateway node G2.

Furthermore, inter-gateway working segment 214W is free to transport traffic to and from intermediate nodes located between the primary and secondary gateway nodes G1,G2 along ring 210. Failure of the primary gateway node G1 does not affect the delivery of such intermediate traffic, while failure of both the primary gateway node and the intermediate node requires the usual and standard squelching of intermediate or inter-ring traffic.

Figure 5C:
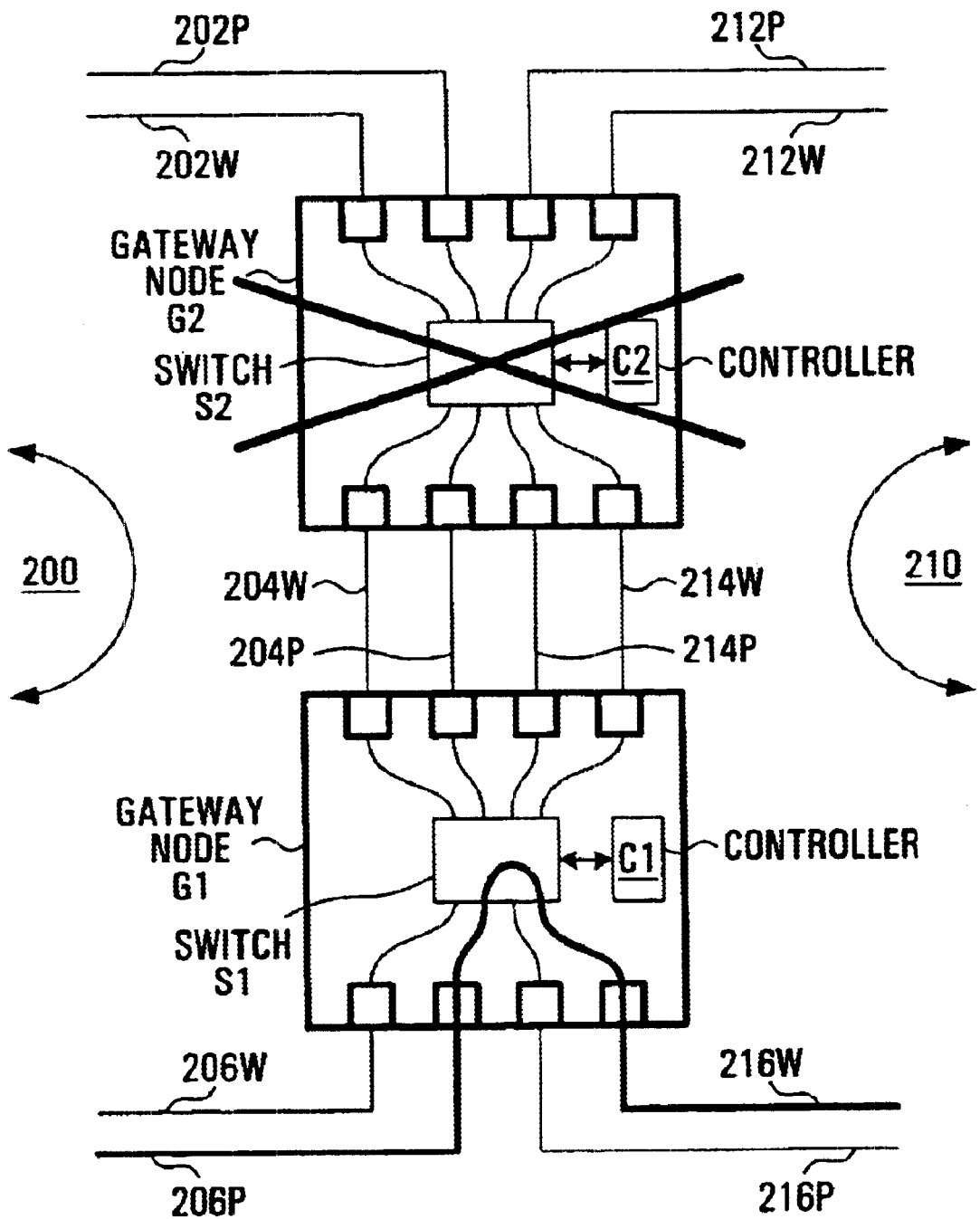
FIG. 5C shows how the primary gateway node in FIG. 5A maintains an inter-ring connection in the event of a failure of the secondary gateway node.

Of course, a failure of the secondary gateway node G2 should also be considered and this is now done with reference to FIG. 5C. Standard automatic ring protection switching will cause the working traffic formerly arriving at the secondary gateway element G2 along working fiber 202W to be looped back onto the protection path. The traffic so looped back will then reach the primary gateway node G1 via protection segment 206P. Since the primary gateway node G1 is also equipped with the standard automatic ring protection switching capability, the controller C1 automatically provides switching instructions to the switch S2 which then establishes contact with protection segment 206P instead of working segment 204W. The resulting flow of traffic resulting therefrom is shown as a thick solid line in FIG. 5C.

Clearly, the above description and illustrations demonstrate that the preferred embodiment of the invention provides survivable inter-ring traffic which is bandwidth-efficient. It is also noted that the switching delay is governed only by the speed of automatic ring protection switching of the self-healing rings and requires no additional hold-off time. Furthermore, by connecting the nodes in a subtending rings configuration, the invention requires only two nodes to be equipped with special switching functionality.

While the preferred embodiment of the present invention has been described and illustrated, it will be apparent to persons skilled in the art that numerous modifications and variations are possible. For example, in an alternate embodiment of the invention, the optical signals travelling across the various fiber segments can be wavelength division multiplexed. In such a case, the gateway nodes G1,G2 would be equipped with respective optical demultiplexers for isolating the individual optical channels carried by an incoming WDM optical signal. Similarly, the gateway nodes would comprise respective multiplexers for the purpose of combining several distinct opto-electronically converted optical signals onto a single WDM optical signal.

The controller in each gateway node could then be connected to those opto-electronic converters which accept incoming optical control channels arriving on the working and protection fibers of each ring via the optical demultiplexers. These control signals could provide the controller with the required OAM&P instructions in encoded form. Also, the controller could provide the encoded OAM&P instructions to those opto-electronic converters which output optical control channels onto fiber segments via respective optical multiplexers.

Moreover, if a dense wavelength-division multiplexing system is employed, it may prove advantageous to employ controllable optical switches instead of electronic ones.

Finally, it will also be apparent to those skilled in the art that the invention is not limited to applications in SONET networks but is indeed usable with other synchronous signalling standards, such as the Synchronous Digital Hierarchy (SDH) commonly used in Europe and in other regions. SDH also provides for automatic ring protection switching and therefore the controller in each gateway node could be altered to perform the additional functions required to maintain survivable inter-ring connections as described herein.

In view of the many further conceivable variations of the invention, its scope is only to be limited by the claims appended hereto.

We claim:

1. A method of delivering communications services between first and second survivable rings each comprising a respective plurality of network elements, at least two of which are common to both rings, the method comprising the steps of, for each service:
   designating one common network element as a primary gateway node and another common network element as a secondary gateway node;
   at the primary gateway node, establishing a primary inter-ring connection for delivery of said service between the first and second rings; and
   at the secondary gateway node, monitoring the status of the primary gateway node and establishing a new inter-ring connection for delivery of said service upon failure of the primary gateway node.

2. A method according to claim 1, wherein at least one ring is a two-fiber bidirectional line-switched ring.

3. A method according to claim 1, wherein at least one ring is a four-fiber bidirectional line-switched ring.

4. A method according to claim 1, wherein the first ring is a two-fiber bidirectional line-switched ring and the second ring is a four-fiber bidirectional line-switched ring.

5. A method according to claim 1,
   wherein adjacent network elements in the first ring are connected by a first working path and by a first protection path;
   wherein adjacent network elements in the second ring are connected by a second working path and by a second protection path;
   wherein the primary inter-ring connection is established between the working path of the first ring and the working path of the second ring; and
   wherein the new inter-ring connection is established between the protection path of the first ring and the protection path of the second ring.

6. A method according to claim 1,
   wherein adjacent network elements in the first ring are connected by a first working path and by a first protection path;
   wherein adjacent network elements in the second ring are connected by a second working path and by a second protection path;
   wherein the primary inter-ring connection is established between the working path of the first ring and the working path of the second ring; and
   wherein the new inter-ring connection is established between the working path of the first ring and the protection path of the second ring.

7. A method according to claim 1,
   wherein adjacent network elements in the first ring are connected by a first working path defining a first inter-gateway working segment between the primary and secondary gateway nodes and by a first protection path;.
   wherein adjacent network elements in the second ring are connected by a second working path defining a second inter-gateway working segment between the primary and secondary gateway nodes and by a second protection path;
   wherein the primary inter-ring connection is established between the working path of the first ring and the second inter-gateway working segment; and
   wherein the new inter-ring connection is established between the protection path of the first ring and the working path of the second ring.

8. A method according to claim 1,
- wherein adjacent network elements in the first ring are connected by a first working path defining a first inter-gateway working segment between the primary and secondary gateway nodes and by a first protection path;
- wherein adjacent network elements in the second ring are connected by a second working path defining a second inter-gateway working segment between the primary and secondary gateway nodes and by a second protection path;
- wherein the primary inter-ring connection is established between the first inter-gateway working segment and the working path of the second ring; and
- wherein the new inter-ring connection is established between the working path of the first ring and the protection path of the second ring.

9. A method of delivering a communications service between a main survivable ring and at least one subtending survivable ring, each ring comprising a respective plurality of network elements, at least two of which are common to the main ring and the at least one subtending ring, the method comprising the steps of, for each service:
- designating one common network element as a primary gateway node and another common network element as a secondary gateway node;
- at the primary gateway node, establishing a primary inter-ring connection for delivery of the service between the main ring and one of the at least one subtending ring;and
- at the secondary gateway node, monitoring the status of the primary gateway node and establishing a new Inter-ring connection for delivery of the service upon failure of the primary gateway node.

10. A network element configuration for delivering communications services between first and second survivable rings, comprising:
- a primary gateway node connectable to the first and second rings, comprising a switch for controllably establishing connections between the first and second rings and a controller for controlling the switch and being operable to establish a primary inter-ring connection for delivering a service between the first and second ring;
- a secondary gateway node connectable to the first and second rings, comprising a switch for controllably establishing connections between the first and second rings and a second controller for controlling the switch and being operable to monitor the status of the primary gateway node and establish a new interring connection for delivery of said service upon failure of the primary gateway node.

11. A network element configuration according to claim 10, wherein the primary and secondary gateway nodes further comprise a respective memory element accessible to the first and second controllers, respectively, for storing program code executed by the first and second controllers, respectively.

12. A network element configuration according to claim 10, wherein the network elements in each ring exchange control information with one another and wherein the control information comprises at least the status of the primary gateway node.

13. A network element configuration according to claim 11, wherein the network elements in each ring exchange control information with one another and wherein the control information comprises at least program code for storage in the memory element of a corresponding gateway node.

14. A network element configuration according to claim 13, wherein the network elements in each ring exchange control information with one another and wherein the control information further comprises at least the status of the primary gateway node.

15. A network element configuration according to claim 10, wherein the first and second rings are fiber optic rings comprising fiber optic segments and wherein the primary and secondary gateway nodes are each connected to at least two fiber optic segments of each ring.

16. A network element configuration according to claim 15, wherein the switch in the primary gateway node and the switch in the secondary gateway node are electronic and wherein the primary and secondary gateway nodes further comprise respective opto-electronic converters connected to the respective switch, for converting incoming optical signals into electronic signals fed to the respective switch and for converting the signals switched by the respective switch into optical signals for transmission across the fiber optic segments connected to the respective gateway node.

17. A network element configuration according to claim 15, wherein the switch in the primary gateway node and the switch in the secondary gateway node are optical.

18. A network element configuration according to claim 15, wherein the fiber optic segments carry wavelength-division multiplexed optical signals.

* * * * *